(12) United States Patent
Hidaka et al.

(10) Patent No.: US 10,138,844 B2
(45) Date of Patent: Nov. 27, 2018

(54) THRUST CONTROL VALVE AND FLYING OBJECT

(71) Applicant: MITSUBISHI HEAVY INDUSTRIES, LTD., Tokyo (JP)

(72) Inventors: Shozo Hidaka, Tokyo (JP); Atsushi Moriwaki, Tokyo (JP); Kensuke Futahashi, Tokyo (JP); Shuhei Hosaka, Tokyo (JP); Masaaki Nagase, Tokyo (JP); Kohei Kojima, Tokyo (JP); Mitsuru Inada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 148 days.

(21) Appl. No.: 14/908,349

(22) PCT Filed: Oct. 18, 2013

(86) PCT No.: PCT/JP2013/078381
§ 371 (c)(1),
(2) Date: Jan. 28, 2016

(87) PCT Pub. No.: WO2015/022758
PCT Pub. Date: Feb. 19, 2015

(65) Prior Publication Data
US 2016/0208743 A1    Jul. 21, 2016

(30) Foreign Application Priority Data
Aug. 12, 2013 (JP) .................................. 2013-167921

(51) Int. Cl.
*F02K 9/86* (2006.01)
*F02K 9/80* (2006.01)
(Continued)

(52) U.S. Cl.
CPC .............. *F02K 9/86* (2013.01); *B64D 27/023* (2013.01); *B64D 31/00* (2013.01); *F02K 9/80* (2013.01); *F02K 9/94* (2013.01); *F05D 2250/75* (2013.01)

(58) Field of Classification Search
CPC ........... B64G 1/403; B64G 1/401; F02K 9/80; F02K 9/58; F02K 9/86; F02K 9/84; B64D 27/023; B64C 15/14; B64C 15/00
See application file for complete search history.

(56) References Cited

U.S. PATENT DOCUMENTS 2,583,570 A    1/1952   Hickman
3,011,309 A *  12/1961  Carter ...................... F02K 9/86
                                                     102/377
(Continued)

FOREIGN PATENT DOCUMENTS

EP    2143927 A1 *  1/2010 ............... F02K 1/09
FR    1012021       7/1952
(Continued)

OTHER PUBLICATIONS

Notification of Reasons for Refusal dated Dec. 13, 2016 in corresponding Japanese Application No. 2013-167921 (with English translation).

(Continued)

*Primary Examiner* — Benjamin P Lee
(74) *Attorney, Agent, or Firm* — Wenderoth, Lind & Ponack, L.L.P.

(57) ABSTRACT

A thrust control valve equipped with: a valve element, in which a gas injection passage, through which an operating gas is injected, is formed, with a valve-seating surface being formed in the gas injection passage; and a valve stem, which is provided in the interior of the gas injection passage and has a seated surface that makes contact with the valve-seating surface. A guide surface which makes contact with (Continued)

the inner circumferential surface of the gas injection passage of the valve element is formed on the outer circumferential surface of the valve stem. The guide surface is formed downstream from the seated surface in the direction of flow of the operating gas. A V-groove through which the operating gas flows is formed at the tip of the valve stem, downstream from the seated surface in which the guide surface is formed.

11 Claims, 6 Drawing Sheets

(51) Int. Cl.
*F02K 9/94* (2006.01)
*B64D 27/02* (2006.01)
*B64D 31/00* (2006.01)

(56) References Cited

U.S. PATENT DOCUMENTS

| | | | | |
|---|---|---|---|---|
| 3,182,447 | A | | 5/1965 | Bell, Jr. |
| 3,210,928 | A | * | 10/1965 | Zelinski .................. F02K 7/10 60/39.821 |
| 3,302,890 | A | | 2/1967 | Silver |
| 3,317,184 | A | | 5/1967 | Usry |
| 3,914,935 | A | * | 10/1975 | Burkes, Jr. ............... F02K 9/86 60/225 |
| 4,478,040 | A | * | 10/1984 | Johnson .................. F02K 9/86 188/67 |
| 4,777,795 | A | | 10/1988 | Le Corre et al. |
| 4,826,104 | A | * | 5/1989 | Bennett .................. F02K 9/805 239/265.19 |
| 5,749,559 | A | * | 5/1998 | Dumortier ............... B64G 1/26 239/265.19 |
| 6,988,705 | B1 | * | 1/2006 | Hoose ...................... F02K 9/80 137/115.13 |
| 8,016,211 | B2 | * | 9/2011 | Barr ...................... F01D 17/141 239/265.19 |
| 2004/0195363 | A1 | * | 10/2004 | Kato ........................ F02K 9/86 239/265.11 |
| 2010/0005807 | A1 | | 1/2010 | Goislot | |

FOREIGN PATENT DOCUMENTS

| | | | |
|---|---|---|---|
| GB | 1 480 723 | 7/1977 | |
| JP | 8-312463 | 11/1996 | |
| JP | 2002-39014 | 2/2002 | |
| JP | 2003-336545 | 11/2003 | |
| JP | 2004-251181 | 9/2004 | |
| JP | 2004251181 A * | 9/2004 | ............... F02K 9/86 |

OTHER PUBLICATIONS

Written Opinion of the International Searching Authority dated Jan. 7, 2014 in corresponding International Application No. PCT/JP2013/078381.
International Search Report dated Jan. 7, 2014 in corresponding International Application No. PCT/JP2013/078381.
Extended European Search Report dated Apr. 22, 2016 in corresponding European Application No. 13891432.0.

* cited by examiner

THRUST CONTROL VALVE AND FLYING OBJECT

TECHNICAL FIELD

The present invention relates to a thrust control valve and a flying object provided therewith.

BACKGROUND ART

In the related art, thrust control valves that perform the trajectory control and posture control of a flying object are known (for example, refer to PTL 1). The thrust control valves have a nozzle through which a propelling gas (operating gas) flows. A gas supply chamber, a gas passage, and a gas injection chamber are formed in the nozzle from an upstream side in a gas flow direction. A plug is inserted into the inside of the nozzle. The plug is arranged so as to be movable between the gas passage and the gas injection chamber. When a propulsion control valve is closed, an outer circumferential surface of the plug is brought into close contact with an inner circumferential surface of the nozzle, and when the propulsion control valve is opened, the outer circumferential surface of the plug is separated from the inner circumferential surface of the nozzle.

CITATION LIST

Patent Literature

[PTL 1] Japanese Unexamined Patent Application Publication No. 2004-251181

SUMMARY OF INVENTION

Technical Problem

However, in the related-art thrust control valves, the outer circumferential surface of the plug is separated from the inner circumferential surface of the nozzle at the time of valve opening. In this case, since the plug is brought into a free state of being separated from the nozzle, the position of the plug with respect to the nozzle may incline. Specifically, a central axis of the plug and a central axis of the nozzle positionally deviate from each other, and a gap between the inner circumferential surface of the nozzle and the outer circumferential surface of the plug becomes non-uniform, or the central axis of the plug inclines with respect to the central axis of the nozzle. Accordingly, the shape of a flow path between the inner circumferential surface of the nozzle and the outer circumferential surface of the plug may vary. In this case, variations may occur in the injection distribution of the propelling gas from the thrust control valve.

Thus, an object of the invention is to provide a thrust control valve and a flying object that can inject an operating gas suitably, suppressing variations in the injection distribution of the operating gas.

Solution to Problem

The thrust control valve of the invention is a thrust control valve including a valve element in which a gas injection passage, through which an operating gas to be injected flows, is formed and a valve-seating surface is formed in the gas injection passage; and a valve stem that is provided inside the gas injection passage and has a valve-seated surface that makes contact with the valve-seating surface. A guide surface that makes contact with an inner circumferential surface of the gas injection passage of the valve element is formed on an outer circumferential surface of the valve stem.

According to this configuration, the guide surface that makes contact with the inner circumferential surface of the gas injection passage of the valve element is formed in the outer circumferential surface of the valve stem. For this reason, even in a case where the valve-seated surface of the valve stem has been separated from the valve-seating surface of the valve element, the guide surface of the valve stem makes contact with the guided surface of the valve element. Therefore, the valve stem can be guided along the inner circumferential surface of the valve element. Accordingly, since a portion between the valve element and the valve stem can be maintained by the inner circumferential surface of the valve element, the mutual positions of the valve element and the valve stem can be suitably maintained. From the above, the operating gas can be suitably injected, suppressing variations in the injection distribution of the operating gas.

In this case, it is preferable that the guide surface is formed on a downstream side of the valve-seated surface in the gas flow direction of the operating gas.

According to this configuration, even if the operating gas that passes between the valve-seating surface and the valve-seated surface is directed to the downstream side, the valve stem can be guided along the inner circumferential surface of the valve element, on the downstream side of the valve-seated surface. For this reason, it can be made difficult for the operating gas to be influenced. Therefore, the positions of the valve stem and the valve element around the valve-seating surface and the valve-seating surface can be suitably maintained.

In this case, it is preferable that the valve stem has a gas flow part, through which the operating gas flows, formed at a tip on the downstream side of the valve-seated surface in which the guide surface is formed.

According to this configuration, the gas flow part can be formed at the tip. For this reason, the operating gas that has passed between the valve-seating surface and the valve-seated surface can flow through the gas flow part, and can flow to the downstream side in the gas flow direction.

In this case, it is preferable that the gas flow part is a V-groove that has a top part on an upstream side and widens from the top part toward the downstream side.

According to this configuration, if the valve-seating surface of the valve element and the valve-seated surface of the valve stem are separated from each other, the top part of the V-groove appears. As the valve-seating surface of the valve element and the valve-seated surface of the valve stem are further separated from each other, the area of a flow path formed by the V-groove becomes larger. For this reason, the operating gas that flows between the valve-seating surface of the valve element and the valve-seated surface of the valve stem can be suitably made to flow into the V-groove. Additionally, the gas flow part can be formed by simple machining, such as machining the V-groove in the tip. Moreover, it is possible to adjust the injection amount of the operating gas appropriately by forming the shape of the V-groove in a shape according to the injection amount of the operating gas.

In this case, it is preferable that the gas flow part is a plurality of the V-grooves made to intersect each other so as to pass through the center of the valve stem.

According to this configuration, since the plurality of V-grooves can be formed in the tip, the operating gas that flows between the valve-seating surface of the valve element and the valve-seated surface of the valve stem can be suitably made to flow into the plurality of V-grooves.

In this case, it is preferable that the tip has a blocking part provided between the top part of the V-groove and the valve-seated surface.

According to this configuration, even in a case where the valve-seating surface of the valve element and the valve-seated surface of the valve stem are slightly separated from each other due to an influence, such as vibration or shock, given to the valve stem and the valve element, the V-groove does not appear, and the gas injection passage is blocked by the blocking part. Therefore, unexpected injection of the operating gas under the influence on the valve stem and the valve element can be suppressed.

In this case, it is preferable that the gas flow part has a through-hole that is formed in the tip from the upstream side in the gas flow direction to the downstream side so as to pass therethrough.

According to this configuration, if the valve-seating surface of the valve element and the valve-seated surface of the valve stem are separated from each other, the through-hole appears. For this reason, the operating gas that flows between the valve-seating surface of the valve element and the valve-seated surface of the valve stem can be suitably made to flow into the through-hole.

In this case, it is preferable that the through-hole has a rectangular shape that is curved along the guide surface, in a section cut by a plane orthogonal to the gas flow direction.

According to this configuration, it is possible to adjust the injection amount of the operating gas appropriately by forming the shape of the through-hole having a shape of curved rectangular opening in a shape according to the injection amount of the operating gas.

In this case, it is preferable that the through-hole has a circular shape, in a section cut by a plane orthogonal to the gas flow direction.

According to this configuration, it is possible to adjust the injection amount of the operating gas appropriately by forming the shape of the circular through-hole in a shape according to the injection amount of the operating gas.

In this case, it is preferable that the gas flow part has a groove that is formed in an outer circumferential surface of the tip from the upstream side in the gas flow direction to the downstream side.

According to this configuration, if the valve-seating surface of the valve element and the valve-seated surface of the valve stem are separated from each other, the groove appears. For this reason, the operating gas that flows between the valve-seating surface of the valve element and the valve-seated surface of the valve stem can be suitably made to flow into the groove.

In this case, it is preferable that a gas inflow port that allows the operating gas to flow into the gas injection passage is connected to the gas injection passage, and that the flow path area of the gas flow part nearer to the gas inflow port is smaller than the flow path area of the gas flow part farther from the gas inflow port.

According to this configuration, since the size of the flow path area of the gas flow part can be changed in consideration of the position where the gas inflow port is formed, the injection distribution of the operating gas injected passing through the gas flow part can be made more uniform.

In this case, it is preferable to further include a flow straightening plate that is provided on the upstream side of the valve-seated surface in the gas flow direction and straightens the flow of the operating gas that flows through the gas injection passage.

According to this configuration, since the flow of the operating gas directed to between the valve-seating surface of the valve element and the valve-seated surface of the valve stem can be straightened by the flow straightening plate, the injection distribution of the operating gas injected passing between the valve-seating surface and the valve-seating surface can be made more uniform.

A flying object of the invention includes the above thrust control valve.

According to this configuration, since the posture of the flying object itself or a head body stored on a tip side of the flying object can be controlled by injecting the operating gas of which the injection distribution becomes uniform, the posture can be precisely controlled.

DESCRIPTION OF EMBODIMENTS

Hereinafter, embodiments related to the invention will be described in detail with reference to the drawings. In addition, the invention is not limited by these embodiments. Additionally, constituent elements in the following embodiments include elements capable of being easily substituted by a person skilled in the art, or substantially the same elements.

Embodiment 1

Figure 1:
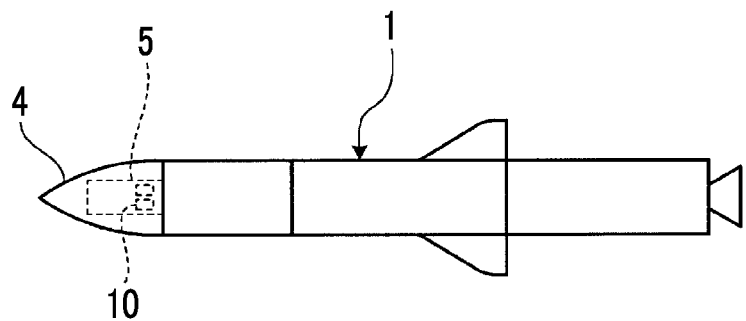
FIG. 1 is a schematic view of a flying object provided with a thrust control valve related to Embodiment 1.

FIG. 1 is a schematic view of a flying object provided with a thrust control valve related to Embodiment 1. As illustrated in FIG. 1, the thrust control valve 10 related to Embodiment 1 is a so-called thruster, and a plurality of the thrust control valves are provided in a head body 5 stored in a nose cone 4 on a tip side of the flying object 1. The plurality of thrust control valves are able to inject an operating gas, thereby controlling a flying object 1. As the control of the flying object 1, the trajectory and posture of the head body 5 exposed from the nose cone 4 of the flying object 1 are controlled. In addition, the invention is not limited to this configuration, and the thrust control valves 10 may be attached to the flying object 1 itself, and the trajectory and posture of the flying object 1 itself may be controlled.

Figure 2:
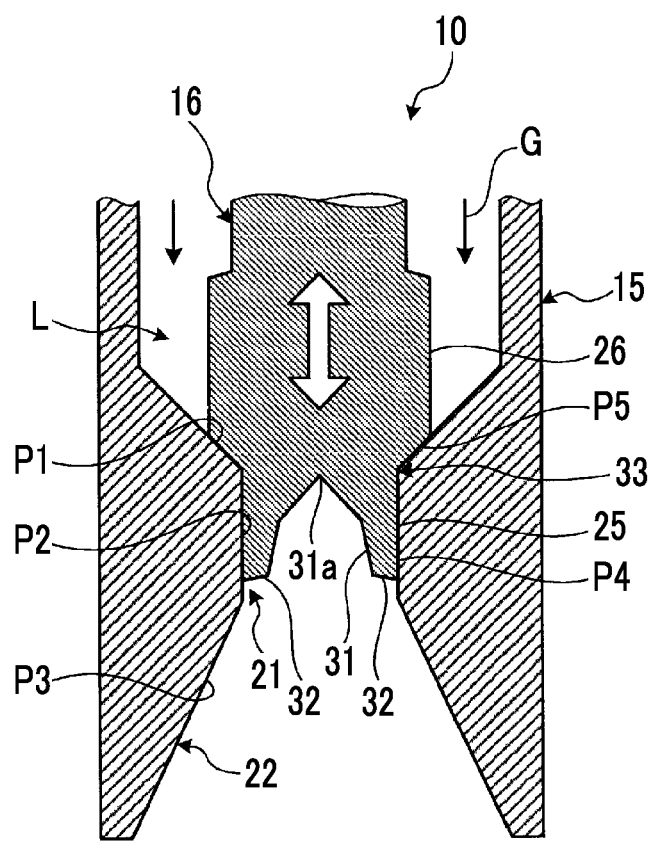
FIG. 2 is a sectional view of the thrust control valve related to Embodiment 1 that is cut along an axial direction.
Figure 3:
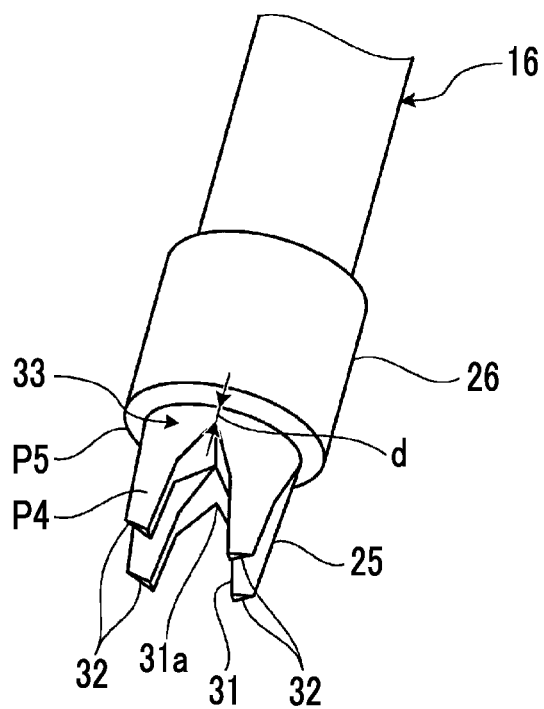
FIG. 3 is a perspective view illustrating a valve stem of the thrust control valve related to Embodiment 1.

FIG. 2 is a sectional view of the thrust control valve related to Embodiment 1 that is cut along an axial direction. FIG. 3 is a perspective view illustrating a valve stem of the thrust control valve related to Embodiment 1. The thrust control valve 10 has a valve element 15 that has a gas injection passage L formed therein, and a valve stem 16 inserted into the interior of the valve element 15 along the gas injection passage L.

The valve element 15 is formed in a cylindrical shape, and has the gas injection passage L having a hollow columnar shape, through which an operating gas G to be injected flows, formed therein. In addition, the valve element 15 may be constituted of a plurality of members or may be constituted a single member. The valve element 15 includes a throttle part 21 that protrudes to a radial inner side, and a nozzle part 22 that is provided on a downstream side of the throttle part 21 in a gas flow direction.

A valve-seating surface P1 that comes into close contact with the valve stem 16, and a guided surface P2 that guides the valve stem 16 are formed in the throttle part 21. The valve-seating surface P1 is formed in a tapered shape such that the gas injection passage L is tapered from an upstream side toward a downstream side in the gas flow direction. The guided surface P2 has a cylindrical surface connected to the downstream side of the valve-seating surface P1, and has a smaller diameter as compared to the diameter of the gas injection passage L on the upstream side of the throttle part 21.

The nozzle part 22 is a region that injects the operating gas G, and has a nozzle surface P3 connected to the downstream side of the guided surface P2. The nozzle surface P3 is formed in a tapered shape such that the gas injection passage L widens from the upstream side toward the downstream side in the gas flow direction.

For this reason, the gas injection passage L becomes a passage that has a larger diameter on the upstream side of the valve-seating surface P1, has a reduced diameter in the valve-seating surface P1, has a smaller diameter in the guided surface P2, and has an increased diameter in the nozzle surface P3.

The valve stem 16 is formed in a columnar shape, and is arranged such that an axial center of the valve stem 16 is made to coincide with an axial center of the valve element 15. The valve stem 16 is made reciprocable in the axial direction. The valve stem 16 has a tip 25 that is an end on the downstream side in the gas flow direction, and a valve part 26 provided on the upstream side of the tip 25.

The tip 25 has an outer circumferential surface that becomes a guide surface P4, and comes into sliding contact with the guided surface P2 that is an inner circumferential surface of the gas injection passage L of the valve element 15. For this reason, the tip 25 in the guide surface P4 of the valve stem 16 is formed in a circle shape having a slightly smaller diameter than the internal diameter of the gas injection passage L in the guided surface P2 of the valve element 15. Additionally, a pair of V-grooves 31 (refer to FIG. 3) that function as gas flow parts through which the operating gas G flows toward the nozzle part 22 are formed in the tip 25. Each V-groove 31 has a top part 31a located on the upstream side in the gas flow direction, and has a shape that widens from the top part 31a toward the downstream side. As illustrated in FIG. 3, the pair of V-grooves 31 are orthogonal to each other such that respective top parts 31a pass through the axial center of the valve stem 16. For this reason, four projections 32 having the guide surface P4 are formed on the tip 25 by the pair of V-grooves 31 being formed to intersect each other.

The valve part 26 is formed in a columnar shape having a larger diameter than the internal diameter of the gas injection passage L in the guided surface P2 of the valve element 15. For this reason, the valve part 26 has a size such that the valve part cannot pass through the gas injection passage L in the guided surface P2. The valve part 26 has a valve-seated surface P5 that makes contact with the upstream side of the guide surface P4 of the tip 25. The valve-seated surface P5 has a shape complementary to the valve-seating surface P1 of the valve element 15, and is able to come into close contact with the valve-seating surface P1. That is, the valve-seated surface P5 has a tapered shape that is tapered toward the tip 25.

Additionally, the tip 25 has blocking parts 33 that suppress the flow of the operating gas G between the top parts 31a of the V-grooves 31 and the valve-seated surface P5 of the valve part 26. Each blocking part 33 is a region in which the V-groove 31 provided between the valve part 26 and the projection 32 is not formed, and has a length d in the axial direction. For this reason, even if the valve stem 16 moves in the axial direction in a range such that the valve stem 16 falls within the length d, with respect to the valve element 15 from a state where the valve-seating surface P1 of the valve element 15 and the valve-seated surface P5 of the valve stem 6 have come into close contact with each other, and a portion between the valve-seating surface P1 and the valve-seated surface P5 opens slightly, it is possible to suppress the flow of the operating gas G.

In the thrust control valve 10 configured as described above, if the valve stem 16 moves in an outward direction in which the valve is closed with respect to the valve element 15, the portion between the valve-seating surface P1 of the valve element 15 and the valve-seated surface P5 of the valve stem 16 becomes narrow. When the valve-seating surface P1 of the valve element 15 and the valve-seated surface P5 of the valve stem 16 come into close contact with each other, the thrust control valve 10 is closed.

Meanwhile, if the valve stem 16 moves in a homeward direction in which the valve is opened with respect to the valve element 15 in a state where the valve-seating surface P1 of the valve element 15 and the valve-seated surface P5 of the valve stem 16 have come into close contact with each other, that is, in a valve-closed state, the portion between the valve-seating surface P1 of the valve element 15 and the valve-seated surface P5 of the valve stem 16 widens. In this case, after the blocking parts 33 of the tip 25 of the valve stem 16 have appeared from the throttle part 21 of the valve element 15, the top parts 31a of the V-grooves 31 of the tip 25 of the valve stem 16 appear from the throttle part 21 of the valve element 15. Then, if the portion between the valve-seating surface P1 of the valve element 15 and the valve-seated surface P5 of the valve stem 16 further widens, the V-grooves 31 further appear, and thereby, the area of a flow path for the operating gas G formed by the V-grooves 31 becomes large. If the V-grooves 31 appear from the throttle part 21, the operating gas G passes through the V-grooves 31, flows into the nozzle part 22, and is injected from the nozzle part 22.

In addition, even in a case where the opening degree of the valve stem 16 from the valve element 15 becomes the maximum, the valve stem 16 is brought into the state of being inserted into the throttle part 21 without the tip 25 thereof being pulled out of the throttle part 21 of the valve element 15. That is, the tip 25 of the valve stem 16 is moved in the axial direction in a state where the tip has been inserted into the throttle part 21 of the valve element 15.

In this way, the operating gas G passes through the V-grooves 31, which appear from the throttle part 21, and is thereby injected from the nozzle part 22. In this case, the shape of the V-grooves 31 becomes a shape according to the injection amount of the operating gas G to be injected. That is, when it is desired to make the injection amount of the operating gas G extremely large, the groove width of the V-grooves 31 is increased, and when it is desired to make the injection amount of the operating gas G small, the groove width of V-groove 31 is reduced.

As described above, according to the configuration of Embodiment 1, the guide surface P4 that makes contact with the guided surface P2 of the gas injection passage L of the valve element 15 can be formed in the outer circumferential surface of the valve stem 16. For this reason, even in a case where the valve-seated surface P5 of the valve stem 16 has been separated from the valve-seating surface P1 of the valve element 15, the guide surface P4 of the valve stem 16 makes contact with the guided surface P2 of the valve element 15. Therefore, the valve stem 16 can be guided along the guided surface P2 of the valve element 15. Accordingly, the valve stem 16 can be moved in the axial direction by the guided surface P2 of the valve element 15 in a state where the axial centers of the valve element 15 and the valve stem 16 are made to coincide with each other. For this reason, since the mutual positions of the valve element 15 and the valve stem 16 can be suitably maintained, the operating gas G can be suitably injected, suppressing variations in the injection distribution of the operating gas G.

Additionally, according to the configuration of Embodiment 1, the guide surface P4 can be formed on the downstream side of the valve-seated surface P5. For this reason, the operating gas G that has passed between the valve-seating surface P1 and the valve-seated surface P5 passes through the V-grooves 31 of the tip 25 of the valve stem 16. In this case, since the tip 25 of the valve stem is guided along the guided surface P2 of the valve element 15, it can be made difficult for passing of the operating gas G to be influenced. Therefore, the positions of the valve stem 16 and the valve element 15 can be suitably maintained.

Additionally according to the configuration of Embodiment 1, the V-grooves 31 as the gas flow parts can be formed in the tip 25 on the downstream side of the valve-seated surface P5 in which the guide surface P4 is formed. For this reason, the operating gas G that has passed between the valve-seating surface P1 and the valve-seated surface P5 can be suitably made to flow from the V-grooves 31 toward the nozzle part 22. In this case, the V-grooves 31 formed in the tip 25 can be easily formed by cutout machining. Additionally, it is possible to adjust the injection amount of the operating gas G appropriately by forming the shape of the V-grooves 31 in a shape according to the injection amount of the operating gas G.

Additionally, according to the configuration of Embodiment 1, the blocking parts 33 can be provided between the valve-seated surface P5 of the valve part 26 and the top parts 31a of the V-grooves 31 of the tip 25. For this reason, even in a case where the valve-seating surface P1 of the valve element 15 and the valve-seated surface P5 of the valve stem 16 are slightly separated from each other due to an influence, such as vibration or shock, given to the valve stem 16 and the valve element 15, the top parts 31a of the V-grooves 31 do not appear from the throttle part 21. Therefore, unexpected injection of the operating gas G under the influence on the valve stem 16 and the valve element 15 can be suppressed.

Embodiment 2

Figure 4:
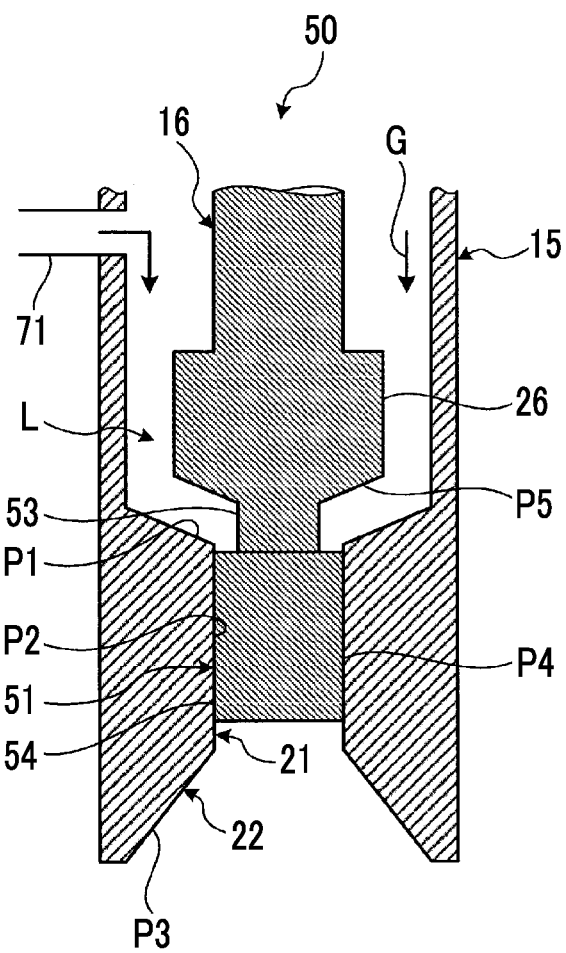
FIG. 4 is a sectional view of a thrust control valve related to Embodiment 2 that is cut along the axial direction.
Figure 5:
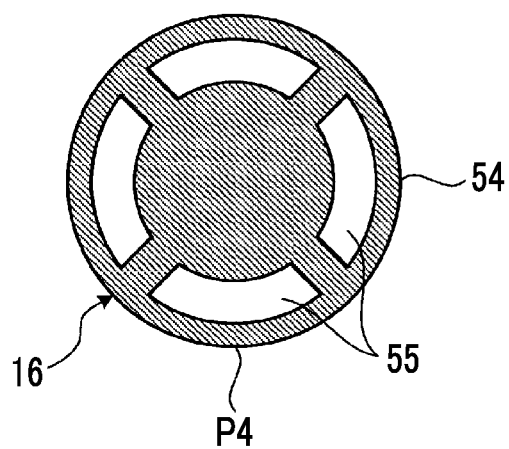
FIG. 5 is a sectional view of a tip of the valve stem of the thrust control valve related to Embodiment 2 that is cut by a plane orthogonal to the axial direction.

Next, a thrust control valve 50 related to Embodiment 2 will be described with reference to FIGS. 4 and 5. FIG. 4 is a sectional view of the thrust control valve related to Embodiment 2 that is cut along the axial direction. FIG. 5 is a sectional view of a tip of the valve stem of the thrust control valve related to Embodiment 2 that is cut by a plane orthogonal to the axial direction. In addition, in Embodiment 2, only different portions from those of Embodiment 1 will be described in order to avoid description that overlaps that of Embodiment 1. Although the V-grooves 31 are formed in the tip 25 of the valve stem 16 in Embodiment 1, through-holes 55 (the details thereof will be described below) are formed in a tip 51 of the valve stem 16 in Embodiment 2. Hereinafter, the thrust control valve 50 related to Embodiment 2 will be described.

As illustrated in FIG. 4, the valve stem 16 of the thrust control valve 50 related to Embodiment 2 has the tip 51 and the valve part 26. In addition, since the valve part 26 has the same configuration as that of Embodiment 1, the description thereof will be omitted. The tip 51 has a smaller-diameter part 53 connected to the valve part 26, and a larger-diameter part 54 connected to the smaller-diameter part 53. The smaller-diameter part 53 has a smaller diameter than the gas injection passage L in the guided surface P2 of the throttle part 21 of the valve element 15. For this reason, a predetermined gap is formed between the smaller-diameter part 53 and the gas injection passage L in the guided surface P2.

The larger-diameter part 54 has an outer circumferential surface that becomes the guide surface P4, and comes into sliding contact with the guided surface P2 that is the inner circumferential surface of the gas injection passage L of the valve element 15. For this reason, the larger-diameter part 54 in the guide surface P4 of the valve stem 16 is formed in a circle shape having a slightly smaller diameter than the internal diameter of the gas injection passage L in the guided surface P2 of the valve element 15. Additionally, the plurality of through-holes 55 (refer to FIG. 5) that function as gas flow parts through which the operating gas G flows toward the nozzle part 22 are formed in the larger-diameter part 54. Each through-hole 55 is formed in the larger-diameter part 54 so as to pass therethrough in the axial direction from the upstream side to the downstream side. Additionally, each through-hole 55 becomes a rectangular opening that is curved along the guide surface P4 in a section viewed from the axial direction, and is formed between the external diameter of the smaller-diameter part 53 and the external diameter of the larger-diameter part 54. The plurality of through-holes 55 are formed side by side along the circumferential direction of the larger-diameter part 54.

In the thrust control valve 50 configured as described above, if the valve stem 16 moves in the homeward direction in which the valve is opened with respect to the valve element 15 in a state where the valve-seating surface P1 of the valve element 15 and the valve-seated surface P5 of the valve stem 16 have come into close contact with each other, that is, in a valve-closed state, the portion between the valve-seating surface P1 of the valve element 15 and the valve-seated surface P5 of the valve stem 16 widens. In this case, the smaller-diameter part 53 of that tip 51 of the valve stem 16 appears from the throttle part 21 of the valve element 15. If the smaller-diameter part 53 appears from the throttle part 21, the operating gas G that passes between the valve-seating surface P1 of the valve element 15 and the valve-seated surface P5 of the valve stem 16 flows into the gap formed between the smaller-diameter part 53 and the gas injection passage L in the guided surface P2. Then, the operating gas G that has flowed into the gap passes through the plurality of through-holes 55, flows into the nozzle part 22, and is injected from the nozzle part 22.

As described above, according to the configuration of Embodiment 2, the valve-seating surface P1 of the valve element 15 and the valve-seated surface P5 of the valve stem 16 are separated from each other, and thereby, the smaller-diameter part 53 appears from the throttle part 21. Accordingly, the plurality of through-holes 55 are opened. For this reason, the operating gas G that flows between the valve-seating surface P1 of the valve element 15 and the valve-seated surface P5 of the valve stem 16 can be suitably made to flow into the plurality of through-holes 55.

Additionally according to the configuration of Embodiment 2, it is possible to adjust the injection amount of the operating gas G appropriately by forming the shape of the through-holes 55 that become the curved rectangular openings in a shape according to the injection amount of the operating gas G.

Embodiment 3

Figure 6:
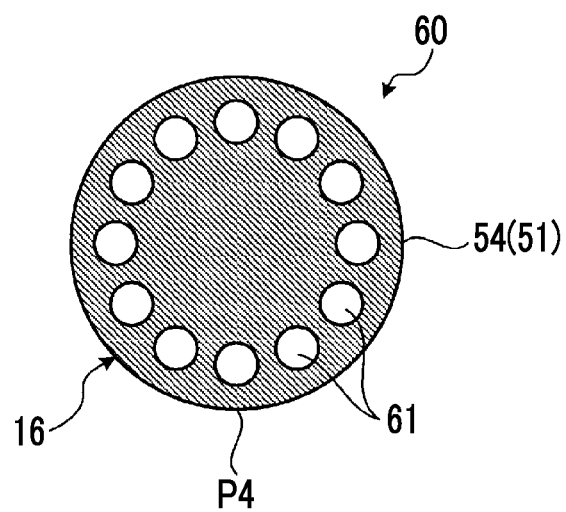
FIG. 6 is a sectional view of a tip of the valve stem of a thrust control valve related to Embodiment 3 that is cut by the plane orthogonal to the axial direction.

Next, a thrust control valve 60 related to Embodiment 3 will be described with reference to FIG. 6. FIG. 6 is a sectional view of a tip of the valve stem of the thrust control valve related to Embodiment 3 that is cut by the plane orthogonal to the axial direction. In addition, in Embodiment 3, only different portions from those of Embodiments 1 and 2 will be described in order to avoid description that overlaps that of Embodiments 1 and 2. In Embodiment 2, the plurality of through-holes 55 that become the curved rectangular openings are formed in the larger-diameter part 54 of the tip 51 of the valve stem 16. However, in Embodiment 3, a plurality of through-holes 61 that become circular openings are formed in the larger-diameter part 54 of the tip 51 of the valve stem 16. Hereinafter, the thrust control valve 60 related to Embodiment 3 will be described.

As illustrated in FIG. 6, in the valve stem 16 of the thrust control valve 60 related to Embodiment 3, the plurality of through-holes 61 that function as gas flow parts through which the operating gas G flows toward the nozzle part 22 are formed in the larger-diameter part 54 of the tip 51. Each through-hole 61 is formed in the larger-diameter part 54 so as to pass therethrough in the axial direction from the upstream side to the downstream side. Additionally, each through-hole 61 becomes a circular opening in the section viewed from the axial direction, and is formed between the external diameter of the smaller-diameter part 53 and the external diameter of the larger-diameter part 54. The plurality of through-holes 61 are formed side by side along the circumferential direction of the larger-diameter part 54. In this case, the internal diameters of the plurality of through-holes 61 become an equal diameter.

As described above, according to the configuration of Embodiment 3, the valve-seating surface P1 of the valve element 15 and the valve-seated surface P5 of the valve stem 16 are separated from each other, and thereby, the smaller-diameter part 53 appears from the throttle part 21. Accordingly, the plurality of through-holes 61 are opened. For this reason, the operating gas G that flows between the valve-seating surface P1 of the valve element 15 and the valve-seated surface P5 of the valve stem 16 can be suitably made to flow into the plurality of through-holes 61.

Additionally according to the configuration of Embodiment 3, it is possible to adjust the injection amount of the operating gas G appropriately by making the internal diameter of the through-holes 61 that become the circular openings be an internal diameter according to the injection amount of the operating gas G.

Embodiment 4

Figure 7:
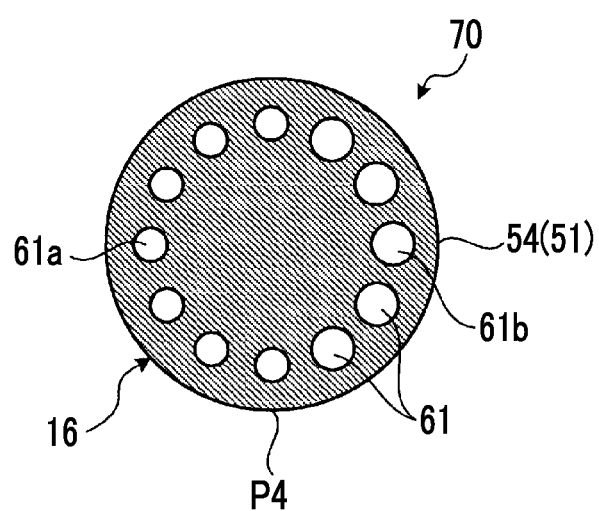
FIG. 7 is a sectional view of a tip of the valve stem of a thrust control valve related to Embodiment 4 that is cut by the plane orthogonal to the axial direction.

Next, a thrust control valve 70 related to Embodiment 4 will be described with reference to FIG. 7. FIG. 7 is a sectional view of a tip of the valve stem of the thrust control valve related to Embodiment 4 that is cut by the plane orthogonal to the axial direction. In addition, in Embodiment 4, only different portions from those of Embodiments 1 to 3 will be described in order to avoid description that overlaps that of Embodiments 1 to 3. In Embodiment 3, the internal diameters of the plurality of through-holes 61 that become the circular openings formed in the larger-diameter part 54 of the tip 51 of the valve stem 16 become an equal diameter. However, in Embodiment 4 the internal diameters of the plurality of through-holes 61 become different diameters. Hereinafter, the thrust control valve 70 related to Embodiment 4 will be described.

Referring to FIG. 4, a gas inflow port 71 that allows the operating gas G to flow into the gas injection passage L therethrough is connected to the gas injection passage L. The gas inflow port 71 is connected to the axial center of the valve element 15 such that the operating gas G flows thereinto from the radial direction.

As illustrated in FIG. 7, in the valve stem 16 of the thrust control valve 70 related to Embodiment 4, among the plurality of through-holes 61 formed to pass through the larger-diameter part 54 of the tip 51, the through-hole 61 nearest to the gas inflow port 71 becomes a through-hole 61a having a smallest internal diameter, and the through-hole 61 furthest from the gas inflow port 71 becomes a through-hole 61b having a largest internal diameter. The plurality of other through-holes 61 have gradually increased internal diameters from the through-hole 61a having a smallest inner diameter toward the through-hole 61b having a largest internal diameter.

As described above, according to the configuration of Embodiment 4, in consideration of the position where the gas inflow port 71 is formed, the internal diameters of the through-holes 61 nearer to the gas inflow port 71 can be made smaller, and the internal diameters of the through-holes 61 farther from the gas inflow port 71 can be made larger. For this reason, even if the distribution in the gas injection passage L of the operating gas G that flows in from the gas inflow port 71 is non-uniform, the injection distribution of the operating gas G that passes through the plurality of through-holes 61 and is injected from the nozzle part 22 can be made uniform.

In addition, although a case where the invention is applied to the through-holes 61 of Embodiment 3 has been described in Embodiment 4, the invention may be applied to the V-grooves 31 of Embodiment 1 or the through-holes 55 of Embodiment 2.

Embodiment 5

Figure 8:
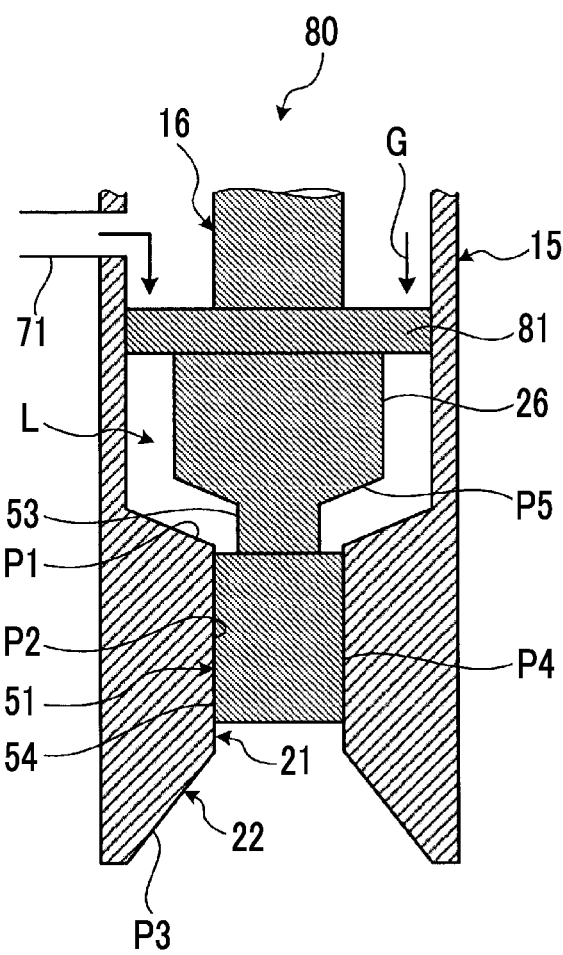
FIG. 8 is a sectional view of a thrust control valve related to Embodiment 5 that is cut along the axial direction.
Figure 9:
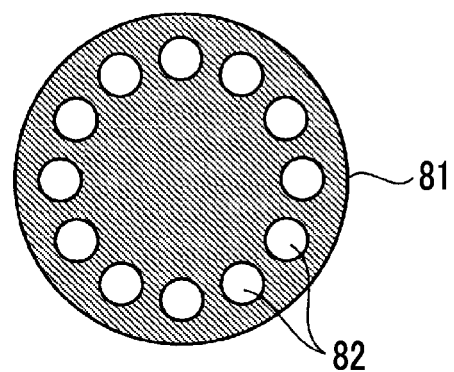
FIG. 9 is a sectional view of a flow straightening plate of the thrust control valve related to Embodiment 5 that is cut by the plane orthogonal to the axial direction.

Next, a thrust control valve 80 related to Embodiment 5 will be described with reference to FIGS. 8 and 9. FIG. 8 is a sectional view of the thrust control valve related to Embodiment 5 that is cut along the axial direction. FIG. 9 is a sectional view of a flow straightening plate of the thrust control valve related to Embodiment 5 that is cut by the plane orthogonal to the axial direction. In addition, in Embodiment 5, only different portions from those of Embodiments 1 to 4 will be described in order to avoid description that overlaps that of Embodiments 1 to 4. In Embodiment 5, the flow straightening plate 81 is attached to the upstream side of the valve part 26 of the valve stem 16. Hereinafter, the thrust control valve 80 related to Embodiment 5 will be described.

As illustrated in FIG. 8, the valve stem 16 has the flow straightening plate 81 provided on the upstream side of the valve part 26 in the gas flow direction. The flow straightening plate 81 is formed in a disc shape, and an outer circumferential surface thereof comes into sliding contact with the inner circumferential surface of the gas injection passage L on the upstream side of the throttle part 21. Additionally, the flow straightening plate 81 is arranged on the downstream side of the gas inflow port 71. As illustrated in FIG. 9, a plurality of flow straightening through-holes 82 through which the operating gas G flows are formed in the flow straightening plate 81. Each flow straightening through-hole 82 is formed in the flow straightening plate 81 so as to pass therethrough in the axial direction from the upstream side to the downstream side. Additionally, each flow straightening through-hole 82 becomes a circular opening in the section viewed from the axial direction, and is formed between an outer circumferential surface of the valve part 26 and the inner circumferential surface of the gas injection passage L. The plurality of flow straightening through-holes 82 are formed side by side along the circumferential direction of the flow straightening plate 81. In this case, the internal diameters of the plurality of flow straightening through-holes 82 become an equal diameter.

As described above, according to the configuration of Embodiment 5, the flow of the operating gas G that flows between the valve-seating surface P1 of the valve element 15 and the valve-seated surface P5 of the valve stem 16 can be straightened by the flow straightening plate 81. Therefore, the injection distribution of the operating gas G injected while passing between the valve-seating surface P1 and the valve-seated surface P5 can be made more uniform.

In addition, in Embodiment 5, the plurality of flow straightening through-holes 82 formed in the flow straightening plate 81 are made to have an equal diameter. However, in consideration of the position where the gas inflow port 71 is formed, the internal diameters of the flow straightening through-holes 82 nearer to the gas inflow port 71 may be made smaller, and the internal diameters of the flow straightening through-holes 82 farther from the gas inflow port 71 may be made larger. Additionally, the flow straightening plate 81 may be applied to any of Embodiments 1 to 4 without being limited to Embodiment 5.

Embodiment 6

Figure 10:
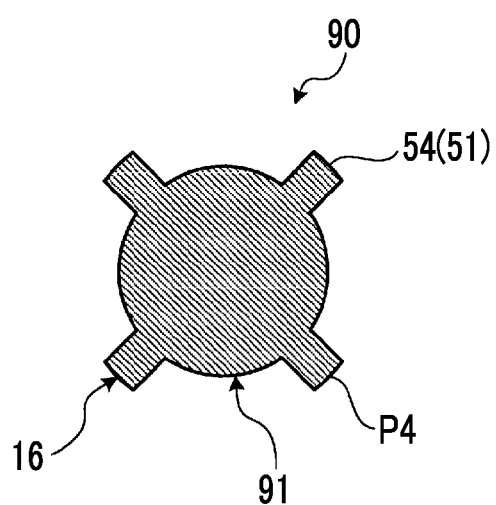
FIG. 10 is a sectional view of a tip of the valve stem of a thrust control valve related to Embodiment 6 that is cut by the plane orthogonal to the axial direction.

Next, a thrust control valve 90 related to Embodiment 6 will be described with reference to FIG. 10. FIG. 10 is a sectional view of a tip of the valve stem of the thrust control valve related to Embodiment 6 that is cut by the plane orthogonal to the axial direction. In addition, in Embodiment 6, only different portions from those of Embodiments 1 to 5 will be described in order to avoid description that overlaps that of Embodiments 1 to 5. In Embodiment 2, the plurality of through-holes 55 are formed in the larger-diameter part 54 of the tip 51 of the valve stem 16 so as to pass therethrough. However, in Embodiment 6, gas flow grooves 91 are formed in the larger-diameter part 54 of the tip 51 of the valve stem 16. Hereinafter, the thrust control valve 90 related to Embodiment 6 will be described.

As illustrated in FIG. 10, in the valve stem 16 of the thrust control valve 90 related to Embodiment 6, the plurality of gas flow grooves 91 that function as gas flow parts through which the operating gas G flows toward the nozzle part 22 are formed in the larger-diameter part 54 of the tip 51. Each gas flow groove 91 is formed in an outer circumferential surface of the larger-diameter part 54 in the axial direction from the upstream side to the downstream side. Additionally, each gas flow groove 91 has a shape that is concavely sunk, in the section viewed from the axial direction. The plurality of gas flow grooves 91 are formed side by side along the circumferential direction of the larger-diameter part 54.

As described above, according to the configuration of Embodiment 6, the valve-seating surface P1 of the valve element 15 and the valve-seated surface P5 of the valve stem 16 are separated from each other, and thereby, the smaller-diameter part 53 appears from the throttle part 21. Accordingly, the plurality of gas flow grooves 91 are opened. For this reason, the operating gas G that flows between the valve-seating surface P1 of the valve element 15 and the valve-seated surface P5 of the valve stem 16 can be suitably made to flow into the plurality of gas flow grooves 91.

Additionally according to the configuration of Embodiment 6, it is possible to adjust the injection amount of the operating gas G appropriately by forming the shape of the gas flow grooves 91 in a shape according to the injection amount of the operating gas G.

REFERENCE SIGNS LIST

1: FLYING OBJECT
4: NOSE CONE
5: HEAD BODY
10: THRUST CONTROL VALVE
15: VALVE ELEMENT
16: VALVE STEM
21: THROTTLE PART
22: NOZZLE PART
25: TIP
26: VALVE PART
31: V-GROOVE
32: PROJECTION
33: BLOCKING PART
50: THRUST CONTROL VALVE (EMBODIMENT 2)
51: TIP (EMBODIMENT 2)
53: SMALLER-DIAMETER PART
54: LARGER-DIAMETER PART
55: THROUGH-HOLE
60: THRUST CONTROL VALVE (EMBODIMENT 3)
61: THROUGH-HOLE (EMBODIMENT 3)
70: THRUST CONTROL VALVE (EMBODIMENT 4)
71: GAS INFLOW PORT
80: THRUST CONTROL VALVE (EMBODIMENT 5)
81: FLOW STRAIGHTENING PLATE
82: FLOW STRAIGHTENING THROUGH-HOLE
90: THRUST CONTROL VALVE (EMBODIMENT 6)
91: GAS FLOW GROOVE
L: GAS INJECTION PASSAGE
G: OPERATING GAS
D: LENGTH OF BLOCKING PART
P1: VALVE-SEATING SURFACE
P2: GUIDED SURFACE
P3: NOZZLE SURFACE
P4: GUIDE SURFACE
P5: VALVE-SEATED SURFACE

The invention claimed is:

1. A thrust control valve comprising:
a valve element in which a gas injection passage, through which an operating gas to be injected flows, is formed and a valve-seating surface is formed in the gas injection passage;
a valve stem that is provided inside the gas injection passage and has a valve-seated surface that makes contact with the valve-seating surface;
a guide surface that is formed at an outer circumferential surface of a tip of the valve stem located on the downstream side of the valve-seated surface in the gas flow direction of the operating gas and that makes contact with an inner circumferential surface of the gas injection passage of the valve element even in a case where the valve-seated surface has been separated from the valve-seating surface; and a gas flow part, through which the operating gas flows, formed in the tip;

wherein an area of the flow path between the gas flow part and an inner surface of the gas injection passage varies depending on a distance between the valve-seating surface of the valve element and the valve-seated surface of the valve stem, and the thrust control valve is closed when the valve-seated surface of the valve stem comes in contact with the valve-seating surface of the valve element.

2. The thrust control valve according to claim 1, wherein the valve stem has a gas flow part, through which the operating gas flows, in the tip.

3. The thrust control valve according to claim 2, wherein the gas flow part is a V-groove that has a top part on an upstream side and widens from the top part toward the downstream side.

4. The thrust control valve according to claim 3, wherein the gas flow part is a plurality of the V-grooves made to intersect each other so as to pass through the center of the valve stem.

5. The thrust control valve according to claim 3, wherein the tip has a blocking part provided between the top part of the V-groove and the valve-seated surface.

6. The thrust control valve according to claim 2, wherein the gas flow part has a groove that is formed in an outer circumferential surface of the tip from the upstream side in the gas flow direction to the downstream side.

7. The thrust control valve according to claim 2, wherein a gas inflow port that allows the operating gas to flow into the gas injection passage is connected to the gas injection passage, and wherein the flow path area of the gas flow part nearer to the gas inflow port is smaller than the flow path area of the gas flow part farther from the gas inflow port.

8. The thrust control valve according to claim 1, further comprising:

a flow straightening plate that is provided on the upstream side of the valve-seated surface in the gas flow direction and straightens the flow of the operating gas that flows through the gas injection passage.

9. A flying object comprising:
the thrust control valve according claim 1.

10. A thrust control valve comprising:

a valve element in which a gas injection passage, through which an operating gas to be injected flows, is formed and a valve-seating surface is formed in the gas injection passage;

a valve stem that is provided inside the gas injection passage and has a valve-seated surface that makes contact with the valve-seating surface;

a guide surface that is formed at an outer circumferential surface of a tip of the valve stem located on the downstream side of the valve-seated surface in the gas flow direction of the operating gas and that makes contact with an inner circumferential surface of the gas injection passage of the valve element even in a case where the valve-seated surface has been separated from the valve-seating surface;

a gas flow part, through which the operating gas flows, formed in the tip; and a flow straightening plate that is provided on the upstream side of the valve-seated surface in the gas flow direction of the operating gas and straightens the flow of the operating gas that flows through the gas injection passage, wherein an area of the flow path between the gas flow part and an inner surface of the gas injection passage varies depending on a distance between the valve-seating surface of the valve element and the valve-seated surface of the valve stem, and the thrust control valve is closed when the valve seated-surface of the valve stem comes in contact with the valve-seating surface of the valve element.

11. A flying object comprising:
the thrust control valve according to claim 10.

* * * * *